Dec. 24, 1963 G. T. BARRETT ETAL 3,115,619

MEMORY SYSTEMS

Filed Dec. 16, 1958 2 Sheets-Sheet 1

INVENTORS.
GEORGE T. BARRETT
and THOMAS E. BAKER, JR.

BY F. L. Sullivan

ATTORNEY.

Dec. 24, 1963 G. T. BARRETT ETAL 3,115,619
MEMORY SYSTEMS
Filed Dec. 16, 1958 2 Sheets-Sheet 2

INVENTORS.
GEORGE T. BARRETT
and THOMAS E. BAKER, JR.
BY F. J. Sullivan
ATTORNEY.

3,115,619

MEMORY SYSTEMS

George T. Barrett, Woburn, and Thomas E. Baker, Jr., Framingham, Mass., assignors, by mesne assignments, to Sylvania Electric Products Inc., Wilmington, Del., a corporation of Delaware Filed Dec. 16, 1958, Ser. No. 780,854
2 Claims. (Cl. 340—174)

This invention is concerned with electronic data processing systems, and particularly with magnetic memories useful in such systems.

Magnetic memories of the kind here under consideration have extensive utility in computers and other data processing equipment where they provide a means for storing electromagnetic indication of the data being processed. A typical example is a magnetic core memory wherein individual ferrite cores each store a bit of binary information, representing a "one" or a "zero" by the condition of their respective states of remanent magnetic flux.

Copending U.S. patent application Serial No. 772,825, filed November 10, 1958, and the patent applications and publications referenced therein may be consulted for detailed theory and description of the structure and operation of such memories. For present purposes it suffices to realize that information is written into and read out of magnetic memory systems by selectively applying, to conductors linking the individual memory cores, READ and WRITE current pulses of sufficient amplitude, and proper polarity, to accomplish the desired switching of the remanent flux condition of the cores concerned.

One of the most critical considerations in the performance of any computer or other data processing system is the time of its memory cycle; i.e., the time it takes to write a bit of information into and read it out of storage by the current pulsing referred to above. This is the controlling factor in the speed capability of computing equipment because modern machines are able to perform computations many times faster than they can obtain from storage the data to be computed.

The most advanced of modern equipment have memory cycles of the order of six to eight microseconds. Consequently, a saving of three to four microseconds in the memory cycle would make it possible for one computer to do the work of two. The economic significance of this possibility, in an industry where average equipments are frequently priced at a million dollars or more per installation, has not been overlooked, and much effort has been directed to the speed-up problem.

These efforts to improve memory access time have followed the direction of improving desirable characteristics of the ferrite material comprising the magnetic cores, and increasing the current drive applied to the cores to accelerate their switching time. The most successful results have combined these two techniques by providing cores which have a "more square" hysteresis characteristic and are less sensitive to minor current variations of the sort which disturb but do not switch the condition of remanent magnetic flux, and by driving these cores with relatively heavy READ current pulses to improve their switching time and signal-to-noise discrimination ratio. Such techniques have promise, but require cores with critical performance ratings. They also present severe switching problems due to the combination of heavy currents and milli-microsecond speeds involved.

Accordingly, a principal object of the present invention is to provide a relatively high speed magnetic memory which is less critical in ferrite material and current switching requirements than those hitherto available. A more general object is to provide an improved memory system for data processing equipment.

These and related objects are accomplished in one embodiment of the invention with a memory system which features using the minor, instead of the major, hysteresis loop for the storage of binary indication of digital information, and, in the illustration described, employs a specialized noise canceling technique and a differential amplifier to eliminate, in the output circuit, any troublesome noise effects or unwanted signals from each selected core, thus providing an output signal which may be reliably interpreted as an indication of the binary condition of the core at the moment of read-out.

Because this memory technique does not require major domain switching of the magnetic cores, and read-out is accomplished at the leading edge of the READ pulse instead of its middle or latter portion in the manner of previous systems, the memory cycle time is significantly shortened and less switching current is required with consequent economy in design and equipment.

Other features, embodiments and modifications of the invention will be apparent from the following description and reference to the accompanying drawings, wherein:

FIG. 4A is a diagram of a "maximum zero" signal from a magnetic core operating in a minor hysteresis loop in the manner of the invention;

FIG. 4B is a diagram of a stored "one" signal from the same core;

FIG. 4C is a diagram of a stored "one" signal from a memory system employing noise canceling techniques in the manner of the invention;

FIG. 4D is a diagram of a stored "zero" in the same system; and,

Figures 1, 2, 3, 4:
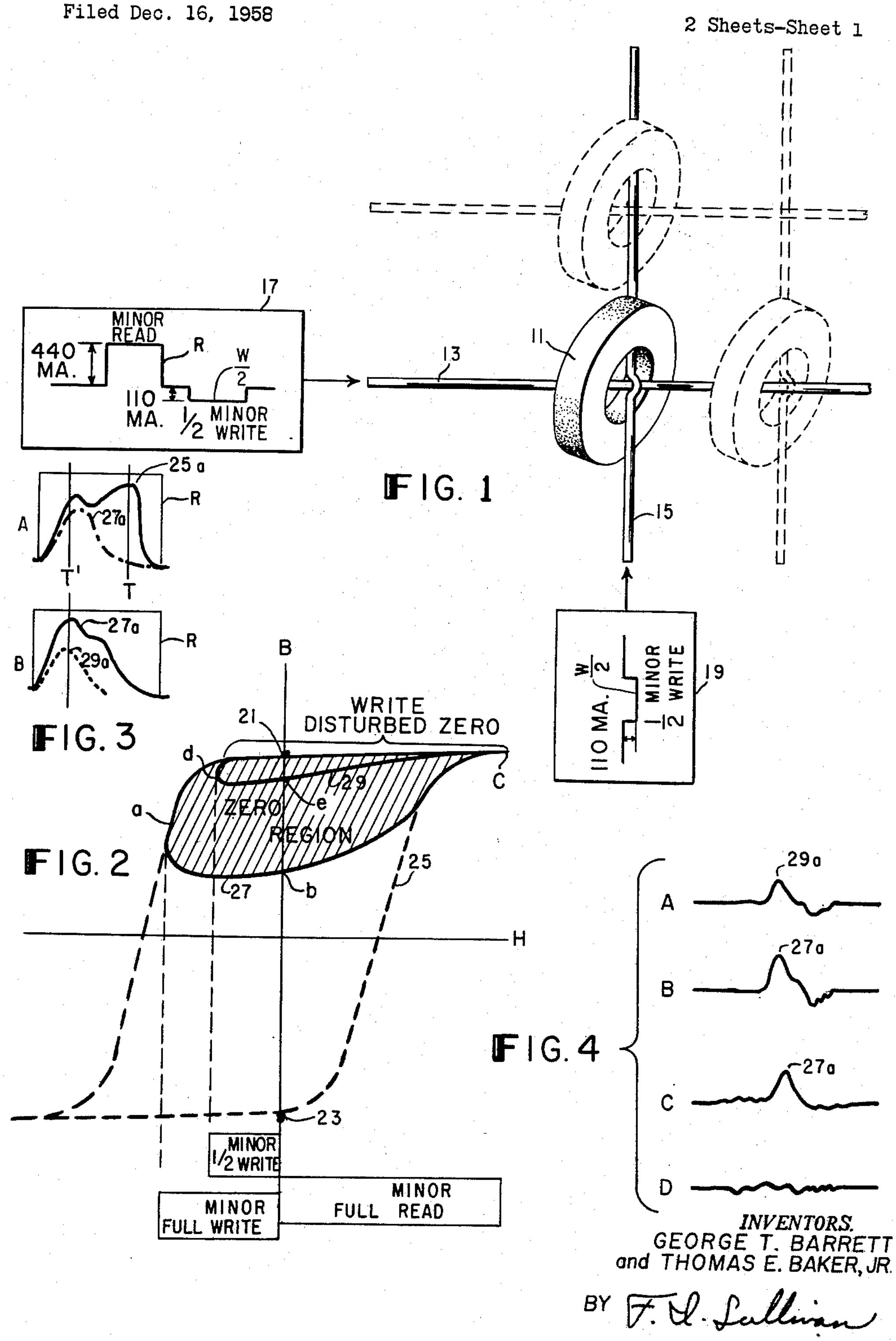
FIG. 1 is a diagrammatic representation of a portion of a memory system embodying the invention.
FIG. 2 is a diagrammatic representation of various hysteresis loops of magnetic material useful in the practice of the invention.
FIGS. 3 (A and B) show, diagrammatically, the relationship of signal outputs, due to the various hysteresis loops of FIG. 2, with the read pulse which causes them and with each other.

The diagram of FIG. 1 shows a magnetic core 11 which is one of many arranged in a matrix of rows and columns linked by horizontal and vertical conductors 13 and 15, respectively. Disregarding, for the present, the values suggested for the driving currents, this arrangement functions as a conventional memory matrix. A source 17 provides a repetitive cycle of a READ pulse followed by a HALF WRITE pulse to the horizontal conductor 13; and, another source 19 applies an additional HALF WRITE pulse to the vertical conductor 15. In this preliminary portion of the explanation, the current pulses which drive a memory in conventional fashion will be referred to as "major" READ and WRITE pulses. Later, when the invention is described, the current pulses with which it drives the memory in a minor loop will be referred to as "minor" READ and WRITE.

In a conventional memory a major READ pulse drives the remanent magnetic flux of the core 11 to the point 21 on the hysteresis plot of FIG. 2, and a coincidence of two major HALF WRITE pulses $$\frac{W}{2}$$

from sources 17 and 19 drives the flux to the point 23 on the same plot. The manner in which this is accomplished, following the substantially square hysteresis loop 25 shown in broken line in FIG. 2, is well known in the art. For this reason, detailed explanation of how this loop is effected will be omitted from this description for the sake of brevity. However, the previously identified patent application and the literature referenced therein may be consulted for specifics.

Referring to FIG. 2, in addition to the major loop 25, two other loops 27 and 29 are shown. Loop 27 is termed a "minor loop." It is the result of partial switching of the core, by applying to it when it is in a first maximum residual state of magnetism or "zero" condition (i.e. at point 21), a current pulse of approximately half the amplitude necessary to accomplish major loop switching. A current of this amplitude, designated "minor FULL WRITE," drives the core toward saturation in the other direction, but because of the limited amplitude and duration of the pulse, the magnetic state of the core passes from the point 21 only to the threshold point *a* and thence to an intermediate state of flux density at point *b*, where the flux density has a value of about one-third of the value at point 21, as shown. Thereafter, upon application of a READ pulse of the amplitude indicated in FIG. 2, the core is driven to saturation in the positive direction to point *c*, and upon termination of this pulse, the core is left with the residual state of magnetism indicated by point 21. Thus, the minor loop 27 lies within the major loop 25, and more particularly, within the positive portion of the major loop.

If a current pulse of approximately one-fourth the amplitude necessary to accomplish major switching, designated "minor ½WRITE" in FIG. 2, is applied to the core when it is in the first maximum residual state of magnetism (at point 21), the flux condition of the core is disturbed as indicated by the loop 29. In this case, the magnetic state of the core passes from the point 21 to the point *d* and thence to an intermediate state of flux density at point *e*, where the flux density is just slightly less than at point 21. Thereafter, upon application of a READ pulse of the amplitude indicated, the core is driven to saturation at point *c*, and upon termination of the pulse, returns to the first maximum residual state of magnetism at point 21. It may be said that the minor loops 27 and 29 are the result of domain reversal in a portion of the core, and the major loop results from a combination of amplitude and time duration in the current pulse adequate to spread this effect throughout the core.

In FIG. 3, the combination of diagrams A and B show the different signal outputs 25*a*, 27*a*, and 29*a*, resulting from core switching in the loops 25, 27, and 29, respectively, and the different relationship in time of these signal responses with respect to the READ pulse R. It should be noted that the peak of the signal response 25*a* to a major domain switching 25 occurs at a time (T) after the center, during the latter portion, of pulse R. The peak of the response 27*a* to loop 27, however, occurs earlier in time ($T^1$) toward the leading edge of the pulse.

As explained in another copending U.S. patent application (Ser. No. 727,602, filed April 25, 1958), it has been the practice to strobe the output of the memory during the latter period of pulse R to assure that the signal output derived in response 25*a*, and not response 27*a*. This strobing alone or in combination with a noise canceling technique of the various types discussed in patent application Ser. No. 772,825, previously referenced, has been necessary to prevent a disturbed "zero" from being mistaken for a stored "one" in the memory read out.

A salient feature of the present invention is that it utilizes the loop 27 and signal response 27*a*, resulting from minor loop switching, to store information instead of the relatively slower loop 25 and its delayed response 25*a*. Instead of developing materials and devices to eliminate the signal 27*a* caused by a major HALF WRITE, this invention takes advantage of the signal 27*a*, and employs a noise canceling technique such as that described in the previously referenced copending patent application Ser. No. 772,825, to distinguish a stored "one" from disturbance noises. Thus, the invention makes it possible to read the "one" at substantially the peak of the "zero" signal instead of waiting for it to subside.

To limit the cores concerned to minor loop switching and operate a memory in this manner, what was previously considered a major HALF WRITE pulse becomes a minor FULL WRITE, and the minor HALF WRITE $$\frac{W}{2}$$

pulses applied to the horizontal and vertical conductors 13 and 15 are the equivalent in current amplitude to major quarter-write pulses for the major domain switching of loop 25. These ratings have been arrived at experimentally by selecting a total WRITE current which is less than that which will induce the core to "creep" to a major loop switching upon successive applications of what is a minor loop switching pulse, and a READ pulse which has sufficient amplitude to return the core to point 21 in FIG. 2 at the end of each write-read cycle. The relative amplitudes of the current pulses required to effect minor loop switching are indicated by the lengths of the blocks at the bottom of the hysteresis diagram of FIG. 2.

The satisfactory results shown in FIG. 4 have been obtained using a minor READ pulse R of 440 ma. and minor HALF WRITE pulses $$\frac{W}{2}$$

of 110 ma. The manufacturer's suggested drive for the cores concerned is a FULL READ of 400 ma. and HALF WRITES of 200 ma. FIG. 4A is the signal output 29*a* of a core in "zero" condition which has been disturbed by a sequence of R and $$\frac{W}{2}$$

pulses of the amplitudes suggested. These pulses have been applied through a horizontal conductor 13 in the manner suggested by FIG. 1.

FIG. 4B is the signal 27*a* from the same core after it has experienced an additional $$\frac{W}{2}$$

pulse of the same value as the first, and coincident with it, applied via its vertical conductor 15 thereby to write a "one" in the core 11.

Amplitudes recorded for these particular signals 29*a* and 27*a* measured approximately 25 and 40 millivolts, respectively, with a duration of approximately 100 millimicroseconds, which brings the complete memory cycle within microsecond capabilities. The noise canceling technique which has been referred to previously, and which will be explained in more detail later, when applied to cores producing the signals of FIGS. 4A and 4B gave the results of FIG. 4C for a stored "one," and of FIG. 4D for a stored "zero." The "one" signal of FIG. 4C was recorded as measuring approximately 20 millivolts.

Figure 5:
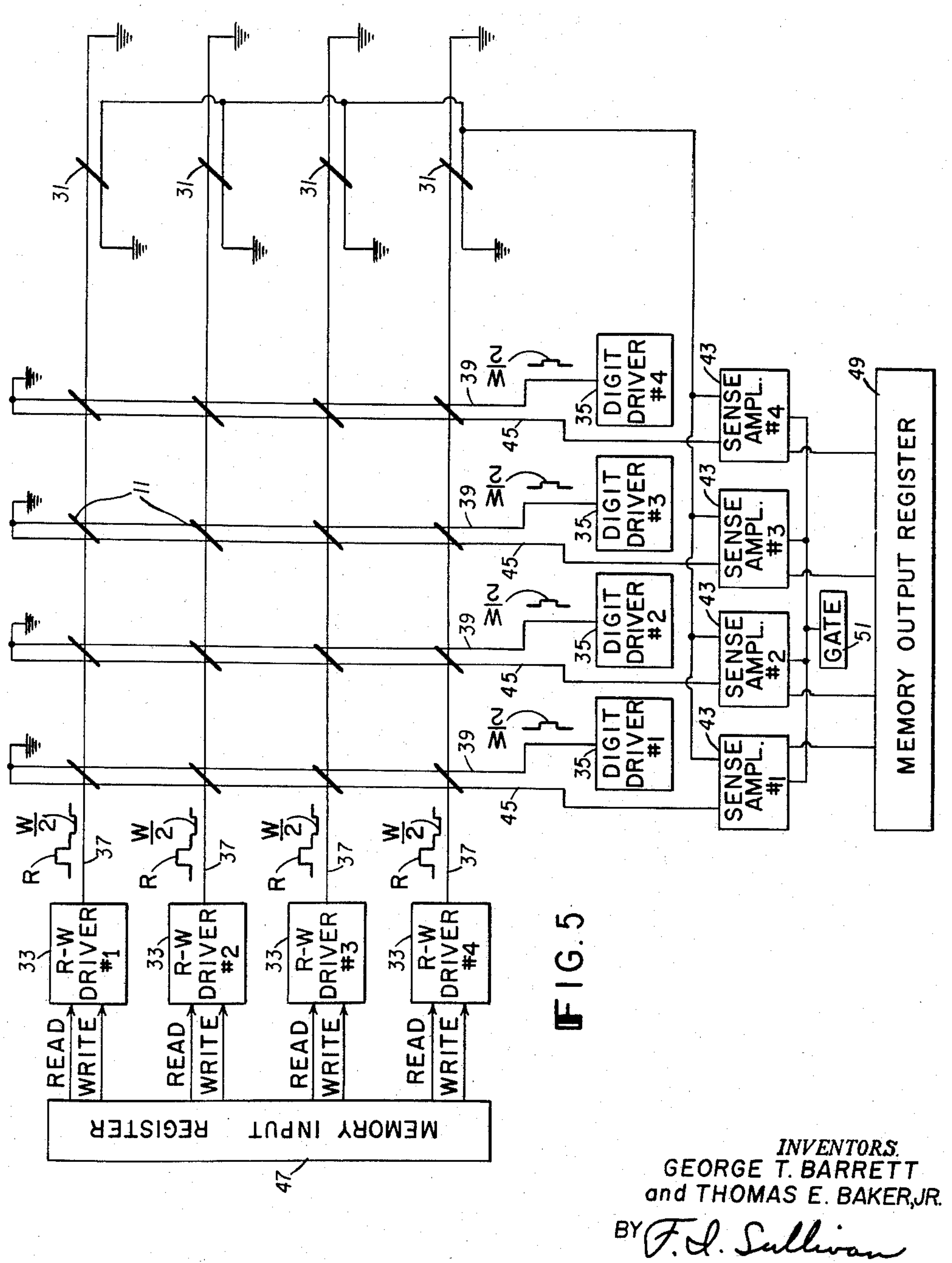
FIG. 5 is a diagrammatic representation of a memory system embodying the invention.

FIG. 5 is a diagrammatic representation of the invention as employed in a memory system. For purposes of illustration, the memory is shown as having a capacity of four words of four digits each. The system illustrated comprises a plurality of information cores 11 arranged in four horizontal rows and four vertical columns. Each row represents a data processing word and the cores of each column, an information bit in the word with which they are associated. A noise canceling core 31 is provided for each word. Each word also has a separate read-write driver 33 and each column, i.e., digit plane, has a common digit driver 35.

Each read-write driver 33 is connected to a horizontal conductor 37 which links all of the cores 11 associated with its particular word and, also, a noise canceling core 31. The drivers apply to the conductors 37 a repetitive cycle of a minor FULL READ pulse R followed by a minor HALF WRITE pulse $$\frac{W}{2}$$

in the manner described with reference to FIG. 1.

The digit drivers 35 are each connected to a vertical conductor 39 which links all the cores 11 in the particular digit plane with which it is associated. These conductors 39 are each pulsed by their respective drivers with minor HALF WRITE $$\frac{W}{2}$$

signals of the relative amplitude previously suggested. In accordance with established techniques, information is written into the memory a word at a time by applying a minor HALF WRITE pulse $$\frac{W}{2}$$

to a selected driver 37 and an additional minor HALF WRITE pulse to the drivers 39 corresponding to the digit locations where it is desired to write a "one." The coincidence of minor HALF WRITE pulses accomplishes a minor domain flux switching and writes a "one" into the cores concerned. The remaining cores of the word, having experienced only one minor HALF WRITE pulse via their conductors 37, traverse loop 29 of FIG. 2 and indicate a "zero." Read-out is accomplished by applying a minor FULL READ pulse R to the driver 37 linking all the cores of the memory address of the word concerned.

As explained in detail in patent application Ser. No. 772,825, during every memory cycle a signal is induced into the output winding 41 linking the noise canceling cores 31 whenever the flux condition of any information core 11 is driven through loop 27 (see FIG. 2) by the sequence of a HALF WRITE pulse $$\frac{W}{2}$$

followed by a FULL READ pulse R from a read-write driver 33. The output winding 41 from the noise canceling cores 31 is connected to the differential sense amplifiers 43 which are each in turn connected to a separate vertical column of information cores 11. These two inputs to amplifiers 43 are connected in balanced opposition. Consequently, the output of a noise canceling core 31 cancels the signal 29*a* from the output winding 45 of each core 11 in which a "zero" is stored because both the information cores in this condition and the noise canceling cores have experienced exactly the same electrical history; i.e., a HALF WRITE pulse followed by a FULL READ. In the amplifiers, however, which are connected to cores that have experienced an additional HALF WRITE pulse, via their respective digit windings 39, with consequent minor domain switching, there will be no cancellation of the signal 27*a* (FIG. 2), except for a minor portion at its leading edge, and a signal indicative of a stored "one" will be derived (FIG. 4C).

The Memory Input Register 47 and the Memory Output Register 49 determine the word location in the memory into which information is to be stored, and from which it is to be extracted. The manner in which this is accomplished is well known in the art and described, for example, in copending U.S. patent application Serial No. 679,967, filed August 23, 1957, now U.S. Patent No. 3,058,096. Its operation does not affect the present invention and need not be discussed here. Similarly, gate 51 is employed in a conventional manner to render the sense amplifiers 43 insensitive to signal outputs, during the write cycle and has no direct bearing on the present invention.

Thus the invention, by using suitable noise canceling techniques, makes it possible to store information into and read it from electromagnetic memory devices operating in fast minor loop switching cycles instead of the inherently slower major loop cycles hitherto employed.

Although the invention has been described with reference to a specific embodiment for illustrative purposes, other modifications and features are within its scope and the purview of the following claims.

What is claimed is:

1. In a magnetic core memory system for storing and retrieving binary "zeros" and "ones," a plurality of magnetic cores each having a substantially square hysteresis loop characteristic and capable of being completely switched from a first maximum residual state of magnetism in one direction to a second maximum residual state of magnetism in the other direction; means coupled to said cores for applying to all of said cores first current pulses of amplitude smaller than required for complete switching to said second state of magnetism for creating in said cores a first intermediate state of flux density between zero and said first maximum residual state to store a "zero"; means coupled to said cores for applying to selected ones of said cores a second current pulse of approximately twice said first current pulse amplitude but of smaller amplitude than required for complete switching to said second state of magnetism for creating in said selected cores a second intermediate state of flux density between zero and said first intermediate state to store a "one"; means coupled to said cores for applying to each of said cores subsequently to each of said first and second pulses a third current pulse of polarity opposite to said first and second pulses and of sufficient amplitude and duration to switch said cores from either of said first and second intermediate states of flux density to said first maximum residual state; means inductively coupled to said cores and operative in response to the switching of said cores from either of said intermediate states of flux density to said first maximum residual state of magnetism to derive a signal from each of said cores; and means for cancelling from the signal derived from each core the portion thereof caused by the change in magnetism of said cores from said first intermediate state of flux density to said first maximum residual state of magnetism.

2. For electronic data processing equipment, a memory system which comprises: a first plurality of magnetic cores arranged in coordinate rows and columns, each core having a substantially square hysteresis loop characteristic and capable of being switched from a first maximum residual state of magnetism is one direction to a second maximum residual state of magnetism in the other direction in response to current pulses of one polarity and of predetermined amplitude, and of being switched from said second maximum residual state to said first maximum residual state in response to current pulses of opposite polarity and said predetermined amplitude; a first set of separate conductors, one corresponding to each of said rows and linking the cores thereof; a second set of separate conductors, one corresponding to each of said columns and linking the cores thereof; means coupled to said row conductors for applying thereto a first current pulse having an amplitude approximately one-fourth said predetermined amplitude for creating in said cores a first intermediate state of flux density slightly less than the flux density at said first maximum residual state to store a "zero"; means coupled to said column conductors for applying to a selected one thereof, when it is desired to store a binary "one" in a core linked by said selected column conductor and a row conductor, a second current pulse of the same amplitude and polarity as said first pulse simultaneously with the application of said first pulse to said row conductors, the coincident application of said first and second pulses being operative to create in said selected core a second intermediate state of flux density between zero and said first intermediate state of flux density; means for applying to said row conductors subsequent to the application of said first current pulse a third current pulse of polarity opposite to said first and second pulses and of sufficient amplitude and duration to switch said cores from either of said first and second intermediate states of flux density to said first maximum residual state; means coupled to said cores and operative in response to the application of said third pulse to derive a signal from each of said cores; a second plurality of magnetic cores each having substantially the same hysteresis characteristics as the cores of said first plurality each linked only by a corresponding one of said row conductors to thereby be subjected to the same cycle of application of said first and third current pulses to said row conductors as the cores of said first plurality are subjected; means coupled to the cores of said second plurality for deriving therefrom in response to the application of said third pulse signals substantially identical to the signals derived from the cores of said first plurality in which a "zero" is stored; and means for comparing the output signals derived from the cores of said first plurality with signals derived from the cores of said second plurality to cancel from said output signals that portion thereof caused by the change in magnetism of said cores from said first intermediate state of flux density to said first maximum residual state of magnetism.

References Cited in the file of this patent

UNITED STATES PATENTS

| | | |
|---|---|---|
| 2,889,540 | Bauer et al. | June 2, 1959 |
| 2,898,580 | Kelly | Aug. 4, 1959 |
| 2,953,774 | Slutz | Sept. 20, 1960 |
| 2,958,853 | Ridler | Nov. 1, 1960 |
| 3,003,139 | Perkins | Oct. 3, 1961 |
| 3,027,547 | Froehlich | Mar. 27, 1962 |

OTHER REFERENCES

"Multi-Stable Magnetic Memory Techniques," Radio-Electronic Engineering, December 1951, pp. 3–5.